United States Patent
Zhang et al.

(10) Patent No.: US 12,466,772 B2
(45) Date of Patent: Nov. 11, 2025

(54) BATCH SINTERING METHOD FOR HIGH-PROPERTY SILICON NITRIDE CERAMIC SUBSTRATE

(71) Applicant: SHANGHAI INSTITUTE OF CERAMICS, CHINESE ACADEMY OF SCIENCES, Shanghai (CN)

(72) Inventors: Hui Zhang, Shanghai (CN); Xuejian Liu, Shanghai (CN); Jindi Jiang, Shanghai (CN); Xiumin Yao, Shanghai (CN); Zhengren Huang, Shanghai (CN); Zhongming Chen, Shanghai (CN); Jian Huang, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 335 days.

(21) Appl. No.: 18/261,180

(22) PCT Filed: Jan. 17, 2022

(86) PCT No.: PCT/CN2022/072351
§ 371 (c)(1),
(2) Date: Jul. 12, 2023

(87) PCT Pub. No.: WO2022/156635
PCT Pub. Date: Jul. 28, 2022

(65) Prior Publication Data
US 2024/0067576 A1 Feb. 29, 2024

(30) Foreign Application Priority Data
Jan. 20, 2021 (CN) .......................... 202110075093.4

(51) Int. Cl.
*C04B 35/584* (2006.01)
*C04B 35/638* (2006.01)
(Continued)

(52) U.S. Cl.
CPC .......... *C04B 37/003* (2013.01); *C04B 35/584* (2013.01); *C04B 35/638* (2013.01);
(Continued)

(58) Field of Classification Search
CPC ... C04B 35/584; C04B 35/591; C04B 35/593; C04B 35/5935; C04B 35/6264;
(Continued)

(56) References Cited

U.S. PATENT DOCUMENTS 5,122,486 A  6/1992  Kito et al.
6,013,357 A  1/2000  Sakuraba et al.
(Continued)

FOREIGN PATENT DOCUMENTS

CN  1522986 A   8/2004
CN  102795860 A  11/2012
(Continued)

OTHER PUBLICATIONS

International Search Report of the International Searching Authority for State Intellectual Property Office of the People's Republic of China in PCT application No. PCT/CN2022/072351issued on Apr. 13, 2022, which is an international application to which this application claims priority.

*Primary Examiner* — Michael A Tolin (57) ABSTRACT

The present disclosure relates to a batch sintering method for a high-property silicon nitride ceramic substrate. The batch sintering method includes: (1) silicon nitride ceramic substrate green bodies are stacked and put into a boron nitride crucible, and a layer of boron nitride powder is applied between adjacent silicon nitride ceramic substrate green bodies; (2) after step-by-step vacuumization, debinding is performed in a nitrogen atmosphere or a reducing atmosphere at 500° C. to 900° C.; (3) gas pressure sintering is then performed in a nitrogen atmosphere at 1800° C. to
(Continued)

2000° C., completing the batch preparation of the high-property silicon nitride ceramic substrate.

14 Claims, 6 Drawing Sheets

(51) Int. Cl.
*C04B 35/64* (2006.01)
*C04B 37/00* (2006.01)
(52) U.S. Cl.
CPC ........ *C04B 35/64* (2013.01); *C04B 2235/428* (2013.01); *C04B 2235/6025* (2013.01); *C04B 2235/6567* (2013.01); *C04B 2235/6581* (2013.01); *C04B 2235/6582* (2013.01); *C04B 2237/08* (2013.01); *C04B 2237/368* (2013.01)
(58) Field of Classification Search
CPC . C04B 35/6303; C04B 35/632; C04B 35/634; C04B 35/63404; C04B 35/6342; C04B 35/638; C04B 35/64; C04B 35/645; C04B 35/65; C04B 35/653; C04B 2235/3206; C04B 2235/3225; C04B 2235/3873; C04B 2235/428; C04B 2235/6025; C04B 2235/6026; C04B 2235/652; C04B 2235/6567; C04B 2235/6581; C04B 2235/6582; C04B 2235/6586; C04B 2235/6587; C04B 2235/95; C04B 2235/96; C04B 2235/9607; C04B 2235/963; C04B 2235/9638
See application file for complete search history.

(56) References Cited

U.S. PATENT DOCUMENTS

2014/0220302 A1* 8/2014 Kaga ..................... C04B 35/64
428/149
2019/0031566 A1* 1/2019 Imamura ................. H05K 1/03

FOREIGN PATENT DOCUMENTS

| | | | |
|---|---|---|---|
| CN | 103781742 A | 5/2014 |
| CN | 104016694 A | 9/2014 |
| CN | 106518089 A | 3/2017 |
| CN | 108495831 A | 9/2018 |
| CN | 109987944 A | 7/2019 |
| CN | 110818428 A | 2/2020 |
| JP | 200253376 A | 2/2002 |
| JP | 2011178598 A | 9/2011 |
| JP | 2012218983 A | 11/2012 |
| WO | 2019235593 A1 | 12/2019 |

* cited by examiner

Table 1:

|  | Content of O in BN/% | Content of C in BN/% | Content of metal ions in BN/% | average grain size of BN /μm |
|---|---|---|---|---|
| Example 1 | 0.8 | 0.001 | 0.02 | 2.0 |
| Example 2 | 0.5 | 0.001 | 0.01 | 3.0 |
| Example 3 | 0.6 | 0.002 | 0.01 | 5.0 |
| Example 4 | 0.7 | 0.002 | 0.02 | 4.5 |
| Example 5 | 0.8 | 0.001 | 0.02 | 3.5 |
| Example 6 | 0.8 | 0.001 | 0.02 | 1.0 |
| Example 7 | 0.8 | 0.001 | 0.02 | 2.0 |
| Example 8 | 0.8 | 0.001 | 0.02 | 2.0 |
| Example 9 | 0.8 | 0.001 | 0.02 | 2.0 |
| Example 10 | 0.8 | 0.001 | 0.02 | 2.0 |
| Example 11 | 0.8 | 0.001 | 0.02 | 2.0 |
| Comparative example 1 | 2.5 | 0.001 | 0.20 | 2.0 |
| Comparative example 2 | 0.8 | 0.100 | 0.02 | 2.0 |
| Comparative example 3 | 0.8 | 0.001 | 0.02 | 8.0 |
| Comparative example 4 | 0.8 | 0.001 | 0.02 | 2.0 |
| Comparative example 5 | 0.8 | 0.001 | 0.02 | 2.0 |
| Comparative example 6 | 0.8 | 0.001 | 0.02 | 2.0 |
| Comparative example 7 | 0.8 | 0.001 | 0.02 | 2.0 |

FIG. 8

Table 2:

| | Green body size/mm | BN powder (mg/cm$^2$) | Stacked number/piece | Step-by-step vacuumization | Debinding | Sintering |
|---|---|---|---|---|---|---|
| Example 1 | 88*73*0.4 | 2.0 | 20 | yes (3 steps) | 700°C×2h、5%H$_2$+N$_2$、0.15MPa | 1920°C×5h、8MPa N$_2$ |
| Example 2 | 88*73*0.32 | 1.5 | 40 | yes (3 steps) | 600°C×3h、3%H$_2$+N$_2$、0.18MPa | 1850°C×8h、2MPa N$_2$ |
| Example 3 | 143*143*0.75 | 2.5 | 30 | yes (3 steps) | 800°C×2h、2%H$_2$+N$_2$、0.13MPa | 1800°C×12h、0.5MPa N$_2$ |
| Example 4 | 143*143*1.0 | 2.0 | 10 | yes (3 steps) | 900°C×1.5h、1%H$_2$+N$_2$、0.12MPa | 2000°C×4h、10MPa N$_2$ |
| Example 5 | 174*238*0.4 | 2.0 | 20 | yes (3 steps) | 700°C×2h、2%H$_2$+N$_2$、0.1MPa | 1900°C×6h、6MPa N$_2$ |
| Example 6 | 88*73*0.4 | 2.0 | 20 | yes (3 steps) | 700°C×2h、5%H$_2$+N$_2$、0.15MPa | 1920°C×5h、8MPa N$_2$ |
| Example 7 | 88*73*0.4 | 1.0 | 20 | yes (3 steps) | 700°C×2h、5%H$_2$+N$_2$、0.15MPa | 1920°C×5h、8MPa N$_2$ |
| Example 8 | 88*73*0.4 | 2.0 | 20 | yes (2 steps) | 700°C×2h、5%H$_2$+N$_2$、0.15MPa | 1920°C×5h、8MPa N$_2$ |
| Example 9 | 88*73*0.4 | 2.0 | 20 | yes (3 steps) | 700°C×2h、N$_2$、0.05MPa | 1920°C×5h、8MPa N$_2$ |
| Example 10 | 88*73*0.4 | 2.0 | 20 | yes (3 steps) | 700°C×2h、N$_2$、0.15MPa | 1920°C×5h、8MPa N$_2$ |
| Example 11 | 88*73*0.4 | 2.0 | 20 | yes (3 steps) | 700°C×2h、5%H$_2$+N$_2$、0.15MPa | 1920°C×5h、8MPa N$_2$ |
| Comparative example 1 | 88*73*0.4 | 2.0 | 20 | yes (3 steps) | 700°C×2h、5%H$_2$+N$_2$、0.15MPa | 1920°C×5h、8MPa N$_2$ |
| Comparative example 2 | 88*73*0.4 | 2.0 | 20 | yes (3 steps)) | 700°C×2h、5%H$_2$+N$_2$、0.15MPa | 1920°C×5h、8MPa N$_2$ |
| Comparative example 3 | 88*73*0.4 | 2.0 | 20 | yes (3 steps)) | 700°C×2h、5%H$_2$+N$_2$、0.15MPa | 1920°C×5h、8MPa N$_2$ |
| Comparative example 4 | 88*73*0.4 | 5.0 | 20 | yes (3 steps) | 700°C×2h、5%H$_2$+N$_2$、0.15MPa | 1920°C×5h、8MPa N$_2$ |
| Comparative example 5 | 88*73*0.4 | 2.0 | 20 | no (1 step) | 700°C×2h、5%H$_2$+N$_2$、0.15MPa | 1920°C×5h、8MPa N$_2$ |
| Comparative example 6 | 88*73*0.4 | 2.0 | 20 | yes (3 steps) | 700°C×2h、5%H$_2$+N$_2$、0.15MPa | 1920°C×5h、0.1MPa N$_2$ |
| Comparative example 7 | 88*73*0.4 | 2.0 | 20 | yes (3 steps) | 700°C×2h、5%H$_2$+N$_2$、0.15MPa | 1920°C×5h、0.3MPa N$_2$ |

FIG. 9

Table 3:

| | Thermal conductivity (W·m⁻¹·K⁻¹) | Breakdown field strength (KV·mm⁻¹) | Substrate size (mm) | Thickness deviation (±mm) | Flatness (±mm) | Surface roughness (μm) | Note | percent of pass/% |
|---|---|---|---|---|---|---|---|---|
| Example 1 | 93 | 42 | 70*58*0.32 | 0.02 | 0.03 | 0.4 | Intact | 96% |
| Example 2 | 96 | 48 | 70*58*0.25 | 0.02 | 0.04 | 0.7 | Intact | 98% |
| Example 3 | 88 | 30 | 114*114*0.6 | 0.01 | 0.02 | 0.8 | Intact | 95% |
| Example 4 | 85 | 28 | 114*114*0.8 | 0.01 | 0.01 | 0.3 | Intact | 95% |
| Example 5 | 95 | 35 | 139*190*0.32 | 0.02 | 0.03 | 0.5 | Intact | 97% |
| Example 6 | 93 | 42 | 70*58*0.32 | 0.02 | 0.04 | 0.4 | Partial sticking | 70% |
| Example 7 | 89 | 39 | 70*58*0.32 | 0.03 | 0.05 | 0.5 | Partial sticking | 65% |
| Example 8 | 92 | 39 | 70*58*0.32 | 0.03 | 0.05 | 0.6 | Partial sticking | 78% |
| Example 9 | 82 | 27 | 70*58*0.32 | 0.02 | 0.03 | 0.4 | A few cracks | 67% |
| Example 10 | 83 | 30 | 70*58*0.32 | 0.02 | 0.03 | 0.4 | Intact | 83% |
| Example 11 | 85-95 | 36-44 | / | 0.02-0.03 | 0.03-0.06 | 0.3-1.0 | Poor consistence | 68% |
| Comparative example 1 | 72 | 14 | 70*58*0.32 | 0.02 | 0.03 | 0.5 | Slight sticking | / |
| Comparative example 2 | 94 | 11 | 70*58*0.32 | 0.02 | 0.03 | 0.5 | Intact | / |
| Comparative example 3 | 94 | 44 | 70*58*0.32 | 0.02 | 0.06 | 1.2 | Intact | / |
| Comparative example 4 | 84 | 36 | 72*60*0.32 | 0.03 | 0.05 | 1.8 | Intact | / |
| Comparative example 5 | 91 | 38 | 70*58*0.32 | 0.03 | 0.05 | 0.6 | Severe sticking | / |
| Comparative example 6 | 75 | 18 | 70*58*0.32 | 0.02 | 0.03 | 1.1 | Intact | / |
| Comparative example 7 | 84 | 26 | 70*58*0.32 | 0.02 | 0.03 | 0.9 | Intact | / |

FIG. 10

BATCH SINTERING METHOD FOR HIGH-PROPERTY SILICON NITRIDE CERAMIC SUBSTRATE

TECHNICAL FIELD

The present disclosure relates to a batch sintering method for a high-property silicon nitride ceramic substrate, which belongs to the field of ceramic material preparation.

BACKGROUND

In recent years, semiconductor devices have rapidly developed towards the direction of high power, high frequency and integration. The heat generated by the operation of a semiconductor device is a key factor which causes the failure of the semiconductor device, and the thermal conductivity of an insulating substrate is a key to affect the heat dissipation of the whole semiconductor device. In addition, in fields, such as electric vehicle and high-speed railway, semiconductor devices often encounter complex mechanical environments, such as bumps and vibrations, during use, which puts strict requirements on the mechanical reliability of materials used.

High-property silicon nitride ($Si_3N_4$) ceramic has excellent mechanical and thermal properties. With the potential of excellent mechanical properties and high thermal conductivity, silicon nitride ceramic is expected to make up for the defects of existing substrate materials, such as alumina and aluminum nitride, and has a great market prospect in the application to high-end semiconductor devices, particularly high-power semiconductor device substrates.

The main sintering processes for silicon nitride ceramic materials are reactive sintering, hot-pressing sintering, pressureless sintering and gas pressure sintering.

In terms of the reactive sintering of silicon nitride, with high-purity Si powder (or introduces a small amount of $Si_3N_4$ powder) as a main material, nitridation is performed at 1300° C. to 1500° C. first to convert Si into $Si_3N_4$, and temperature is then raised to 1750° C. to 1850° C. to further form an $Si_3N_4$ dense ceramic. With a small shrinkage rate (below 5%), this process is suitable for preparing workpieces with complex shapes, but can easily cause problems such as incomplete nitridation, a small amount of free Si remaining and low material properties.

In terms of the hot-pressing sintering of silicon nitride, with $Si_3N_4$ powder as a main material, by introducing a small amount of sintering aids (usually a rare-earth oxide and a metal oxide), an $Si_3N_4$ dense ceramic is formed by a liquid-phase sintering mechanism and mechanical pressure at 1750° C. to 1850° C. under 1 atm nitrogen protection atmosphere. The material prepared by this process generally has excellent properties, but this process needs external mechanical pressure and therefore is only suitable for preparing workpieces with simple shapes. Moreover, since subsequent machining is required, the production efficiency is low, and therefore this process is not suitable for mass production.

In terms of the pressureless sintering (or sintering at atmosphere pressure) of silicon nitride, with $Si_3N_4$ powder as a main material, by introducing an appropriate amount of sintering aids, a dense $Si_3N_4$ ceramic is formed by a liquid-phase sintering mechanism at 1750° C. to 1850° C. under 1 atm nitrogen protection atmosphere. With high production efficiency, this process is suitable for mass production, but $Si_3N_4$ powder is prone to decomposition reaction at high temperature (about 1800° C. or above), resulting in relatively low material properties.

In terms of the gas pressure sintering of silicon nitride, with $Si_3N_4$ powder as a main material, by introducing an appropriate amount of sintering aids, a dense $Si_3N_4$ ceramic is formed by a liquid-phase sintering mechanism at 1800° C. to 2000° C. This process is a preparation process which is developed to solve the problem of high-temperature decomposition existing in the pressureless sintering of silicon nitride, the nitrogen pressure is generally 0.1 MPa to 10 MPa, and the sintering temperature may be increased to 1800° C. to 2000° C. This process solves the problem of high-temperature decomposition of $Si_3N_4$ by employing the inhibiting effect of a high-pressure nitrogen atmosphere, further increasing the sintering temperature to ensure the properties of the prepared material. Moreover, this process keeps the characteristic of high production efficiency and therefore is suitable for mass production. Therefore, this process is recognized as the best process for preparing high-property silicon nitride ceramic materials.

For the mass production of high-property (high thermal conductivity, high strength and high breakdown field strength) silicon nitride ceramic substrate materials, gas pressure sintering is also considered as the most promising and potential process, but still has the following main defects: (1) since there exists a carbon-rich atmosphere in a sintering furnace constructed by a graphite heater and a graphite heat shield, the carbon-rich atmosphere will pollute substrate materials to varying degrees, resulting in a decrease in the insulating property and breakdown field strength of silicon nitride ceramic substrates; (2) the production type sintering furnace generally has a large furnace chamber space, and mainly relies on radiation to transfer heat at a high temperature of 1800° C. to 2000° C., the heating elements of the sintering furnace are generally arranged around the furnace chamber, and as a result, there must be a certain degree of deviation between actual temperatures at different positions in the furnace chamber, which will affect the consistency of material properties; in particular, in order to increase the number of products being treated, it is necessary to arrange multiple layers of grids in the furnace chamber, but this will further aggravate the temperature nonuniformity between the different positions in the furnace chamber.

Technical Solution

In view of the technical problems faced by the batch sintering of high-property silicon nitride ceramic substrates, the inventors propose a batch sintering method for a high-property silicon nitride ceramic substrate by developing a batch preparation process based on gas pressure sintering and through design and control of stacking of multiple substrate green bodies, design and control of crucibles and kiln furniture fixture and design and control of debinding and sintering processes, comprising the following steps: (1) silicon nitride ceramic substrate green bodies are stacked and put into a boron nitride crucible, and a layer of boron nitride powder is applied between adjacent silicon nitride ceramic substrate green bodies; (2) after step-by-step vacuumization, debinding is performed in a nitrogen atmosphere or a reducing atmosphere at 500° C. to 900° C.; the step-by-step vacuumization means that vacuumization is performed in at least two steps or at least three steps; if vacuumization is performed in two steps, the parameters of the step-by-step vacuumization include: 20 to 30 minutes of vacuumization for making the vacuum degree reach 20 kPa to 30 kPa, and 10 to 20 minutes of vacuumization for making the vacuum degree less than 10 Pa; or if vacuumization is performed in three steps, the parameters of the step-by-step vacuumization include: 10 to 15 minutes of vacuumization for making the vacuum degree reach 60 to 80 kPa, 10 to 15 minutes of vacuumization for making the vacuum degree reach 10 to 30 kPa, and 10 to 15 minutes of vacuumization for making the vacuum degree less than 10 Pa; (3) gas pressure sintering is then performed in a nitrogen atmosphere at 1800° C. to 2000° C., completing the batch preparation of the high-property silicon nitride ceramic substrate.

In the present disclosure, by adopting the high-purity boron nitride powder and the crucible, the introduction of metal impurity ions and carbon atmosphere during sintering is prevented, helping to ensure the thermal conductivity and breakdown field strength of the substrate material. Moreover, by utilizing the high-temperature chemical stability of the boron nitride powder, a layer of high-purity boron nitride powder is applied between the substrate green bodies to prevent adjacent substrates from sticking to each other, so as to realize the batch sintering of the stack of the multiple substrates and increase the production efficiency; by adopting the step-by-step vacuumization measure to control vacuumization speed and vacuumizing force, the displacement of the boron nitride powder between the substrate green bodies is prevented, ensuring that the silicon nitride ceramic substrates will not stick to one another during sintering; and by performing heat treatment on the substrate green body in a reducing atmosphere with a micro-positive pressure, the further oxidation of silicon nitride and boron nitride powder is prevented, ensuring the physical properties and surface quality of the prepared silicon nitride ceramic substrate. Through the combined actions of the multiple technical measures mentioned above, the production efficiency is increased and the production cost is reduced on the premise of ensuring the properties of the silicon nitride ceramic substrate.

Preferably, the number of the stacked silicon nitride ceramic substrate green bodies is 5 to 50.

Preferably, in the boron nitride powder, the content of O is not more than 1%, the content of C is not more than 0.01%, and the content of metal impurity ions is not more than 0.02%; and the average grain size of the boron nitride powder is 1 μm to 5 μm, preferably 2 μm to 5 μm. In the present disclosure, by controlling the purity (the content of O, the content of C, the content of metal impurity ion, etc.) of the boron nitride powder, the silicon nitride ceramic material is prevented from being polluted, thus ensuring the thermal conductivity and breakdown field strength of the ceramic substrate. In the present disclosure, the surface quality (flatness, roughness, etc.) of the prepared silicon nitride ceramic substrate is ensured mainly by controlling the grain size of the boron nitride powder.

Preferably, the amount of the boron nitride powder used is 1.0 to 2.5 mg/cm$^2$, preferably 1.5 to 2.5 mg/cm$^2$. In the present disclosure, by controlling the amount of the boron nitride powder applied on the unit area of the substrate green body, the uniform shrinkage and good isolation effect of the silicon nitride ceramic substrate are ensured.

Preferably, in Step (2), the pressure of the nitrogen atmosphere or the reducing atmosphere is 0.05 MPa to 0.2 MPa, preferably 0.1 MPa to 0.2 MPa, and this pressure range belongs to micro-positive pressure, helping to increase the product percent of rate; the reducing atmosphere is a nitrogen/hydrogen mixed atmosphere with a hydrogen content not higher than 5%; and the duration of debinding is 1 to 3 hours.

Preferably, the pressure of the nitrogen atmosphere in the gas pressure sintering is 0.5 MPa to 10 MPa; and the duration of the gas pressure sintering is 4 to 12 hours.

Preferably, a plurality of boron nitride crucibles are evenly arranged in a graphite kiln furniture for gas pressure sintering; and preferably, the graphite kiln furniture is of a multi-layer grid structure. Further, according to the present disclosure, the internal temperature field of the sintering furnace is further homogenized by adopting the high-heat capacity graphite kiln furniture fixture with the multi-layer grid structure, thereby ensuring the high performance consistency of the batch gas pressure sintering of the silicon nitride ceramic substrate.

Preferably, the silicon nitride ceramic substrate green body is prepared by adopting slurry tape-casting or powder pressing. The slurry tape-casting comprises the following steps: (1) after at least one of silicon nitride powder and silicon powder as original powder, sintering aids, dispersant, defoamer, binder and plasticizer are mixed in a protective atmosphere, the mixture is degassed in vacuum to obtain a mixed slurry; (2) tape-casting and drying are performed in a nitrogen atmosphere to obtain a first green body; (3) shaping pretreatment is performed on the resulting first green body to obtain a silicon nitride ceramic substrate green body; preferably, if the original powder contains the silicon powder, the weight of the silicon powder is not less than 75% of that of the original powder, wherein the weight of the original powder is the sum of the weight of the silicon nitride powder and the weight of silicon nitride produced after the complete nitridation of the silicon powder; more preferably, before gas pressure sintering, the debound silicon nitride ceramic substrate green body is nitrided, and the parameters of the nitridation include: nitrogen atmosphere: nitrogen/hydrogen mixed atmosphere with a hydrogen content not higher than 5%; pressure: 0.1 MPa to 0.2 MPa; nitridation temperature: 1350° C. to 1450° C.; and duration of nitridation: 3 to 6 hours.

In another aspect, the present disclosure further provides a high-property silicon nitride ceramic substrate prepared by the aforementioned batch sintering method, wherein the percent of pass of the high-property silicon nitride ceramic substrate is more than or equal to 60%, preferably not less than 70%, more preferably not less than 80%, and most preferably not less than 90%.

Beneficial Effect

One of the remarkable characteristics of the present disclosure is that the introduction of impurity ions is prevented by using the high-purity boron nitride powder and the crucible, helping to ensure the thermal conductivity and breakdown field strength of the substrate. Another remarkable characteristic of the present disclosure is that the batch sintering of the high-property silicon nitride ceramic substrate is implemented by adopting measures such as stacking, kiln furniture fixture design and vacuumization process control, increasing the production efficiency and reducing the production cost.

BRIEF DESCRIPTION OF DRAWINGS

FIG. 9 is Table 2 which shows preparation processes for silicon nitride ceramic substrates in the present disclosure.

DETAILED DESCRIPTION OF PREFERRED EMBODIMENTS

The present disclosure will be further illustrated by the following embodiments below, and it should be understood that the following embodiments are only used to illustrate the present disclosure rather than to limit it.

In the present disclosure, the batch sintering of a high-property silicon nitride ceramic substrates is implemented by a gas pressure sintering process, which specifically includes the following steps: design and control of stacking of multiple substrate green bodies, design and control of crucibles and kiln furniture fixture, design and control of debinding and sintering processes, thus realizing the batch sintering of the high-property silicon nitride ceramic substrate.

A batch sintering method for a high-property silicon nitride ceramic substrate will be illustrated by way of example below.

Preparation of Silicon Nitride Ceramic Substrate Green Body: Specifically, the silicon nitride ceramic substrate green body is prepared through the processes of slurry preparation, vacuum degassing, tape-casting, green body drying, green body shaping and so on in a tape-casting preparation process.

In the present disclosure, the object of reducing or eliminating bubbles in slurry and reducing agglomeration in the slurry is achieved thorough ball-milling and mixing in a protective atmosphere in combination with long-time degassing treatment in low vacuum. Through the precise control of a cylindrical scraper and height thereof in the process of tape-casting and the measure of drying a tape-cast film green body in a continuous hot $N_2$ atmosphere with increasing temperature, the preparation of a high-quality, defect-free tape-cast film and the precise control of thickness uniformity thereof are realized. The secondary oxidation of the silicon nitride powder material is inhibited by ball milling and mixing, $N_2$ protective atmosphere in the process of tape-casting and other measures, ensuring that the prepared silicon nitride ceramic substrate has high thermal conductivity. The density, thickness uniformity and flatness of the prepared tape-cast film are further increased by a cold isostatic press shaping pretreatment process.

Preparation of agglomerate-free and Bubble-free Slurry: at least one of silicon nitride powder and silicon powder as an original powder, sintering aids, dispersant, defoamer, binder and plasticizer are ball-milled and mixed in a protective atmosphere (for example, $N_2$ atmosphere with a pressure of 0.1 MPa) and then degassed in vacuum to prepare an agglomerate-free and bubble-free mixed slurry. In the process of ball milling, silicon nitride ceramic milling balls and anhydrous ethanol are used as ball milling media. The sintering aids may be a rare-earth oxide and an alkaline earth metal oxide, accounting for 4 wt % to 5 wt % of the total weight of the silicon nitride powder or/and silicon nitride formed by the thorough nitridation of the silicon powder and the sintering aids. The rare-earth oxide at least contains $Y_2O_3$. The alkaline earth metal oxide at least contains MgO. The molar ratio of the rare-earth oxide to the alkaline earth metal oxide may be (1.0-1.4): (2.5-2.9). If the silicon powder is contained, the content of the silicon powder accounts for 75 wt % to 100 wt % of the total weight of the silicon nitride powder or/and silicon nitride formed by the thorough nitridation of the silicon powder. The prepared slurry is vacuumized to remove bubbles, the vacuum degree may be −0.1 kPa to −10 kPa, and the duration of degassing may be 6 to 24 hours. The dispersant is selected from at least one of polyethylene glycol (PEG) and triethyl phosphate (TEP), and the added amount is 0.2 wt % to 1.0 wt % of the total weight of the silicon nitride powder, silicon nitride formed by the thorough nitridation of the silicon powder and the sintering aids. The deformer is oleic acid, and the added amount is 0.2 wt % to 1.0 wt % of the total weight of the silicon nitride powder, silicon nitride formed by the thorough nitridation of the silicon powder and the sintering aids. The binder is polyvinyl butyral (PVB), and the added amount is 5 wt % to 9 wt % of the total weight of the silicon nitride powder, silicon nitride formed by the thorough nitridation of the silicon powder and the sintering aids. The plasticizer is selected from at least one of diethyl phthalate (DEP), dibutyl phthalate (DBP) and polyethylene glycol (PEG), and the added amount is 2 wt % to 6 wt % of the total weight of the silicon nitride powder, silicon nitride formed by the thorough nitridation of the silicon powder and the sintering aids.

Preparation of Tape-cast Film Green Body with Uniform Thickness and No Bubbles on Surface: tape-casting is performed in a $N_2$ atmosphere (0.1 MPa to 0.2 MPa). Drying is performed in a flowing hot $N_2$ atmosphere (flow rate: 10 to 1000 liters/min), thus completing the preparation of the tape-cast film green body with uniform thickness and no bubbles on the surface. As an example, a cylindrical scraper is used for tape-casting in the $N_2$ atmosphere, and the thickness of the tape-cast film green body is adjusted by controlling the height of the scraper. The tape-cast film green body is dried by the flowing hot $N_2$ atmosphere with increasing temperature, and the hot $N_2$ atmosphere has a temperature range from 40° C. to 85° C. and an atmosphere pressure of 0.1 MPa to 0.2 MPa. In some examples, there are two passing temperature stages: in the first stage, the temperature is 40° C. to 65° C. and the duration of drying is 15 to 30 minutes; in the second stage, the temperature is 60° C. to 85° C. and the duration of drying is 15 to 30 minutes; and the temperature in the first stage is lower than that in the second stage. In some examples, there are three passing temperature stages: in the first stage, the temperature is 40° C. to 60° C. and the duration of drying is 5 to 20 minutes;

in the second stage, the temperature is 55° C. to 70° C. and the duration of drying is 5 to 20 minutes; in the third stage, the temperature is 65° C. to 85° C. and the duration of drying is 5 to 20 minutes; the temperature in the first stage is lower than that in the second stage, and the temperature in the second stage is lower than that in the third stage.

Shaping Pretreatment of Tape-cast Film Green Body (First Green Body): under a certain pressure (40 MPa to 200 MPa), the cut tape-cast film green body (substrate green body) is subjected to cold isostatic press shaping pretreatment to increase the thickness uniformity and flatness of the casting film, giving the silicon nitride ceramic substrate green body. The duration of shaping pretreatment may be 2 to 10 minutes.

Preparation of Stacked Substrate Green Bodies: a certain number of silicon nitride ceramic substrate green bodies are stacked, and a layer of high-purity boron nitride powder is applied between the substrate green bodies to prevent adjacent substrates from sticking to each other. The number of the stacked substrate green bodies may be 5 to 50 within which stack sintering is benefited. If the number of the stacked substrates is less than 5, the production efficiency will be affected. If the number of the stacked substrates is more than 50, the difference between the stress states of the upper substrates and the lower substrates is excessive, which will affect the consistency between the substrates, and the lower substrates can easily stick to one another. In the high-purity boron nitride powder, the content of O is not more than 1%, the content of C is not more than 0.01%, and the content of metal impurity ions is not more than 0.02%. If the contents of O, C and metal impurity ions in boron nitride powder are too high, the thermal conductivity and breakdown field strength of the substrate will be decreased to a certain degree. The average grain size of high purity may be 1 μm to 5 μm. If the average grain size of the boron nitride powder used is too small, the prepared substrates can easily stick to one another, and the decrease of the grain size of the boron nitride powder also tends to be accompanied by the increase of the content of O, leading to the deterioration of the thermal conductivity, breakdown field strength and other properties of the prepared substrates. If the average grain size of the boron nitride powder used is too large, the flatness of the prepared substrates will decrease and the surface roughness will increase. In an alternative embodiment, the boron nitride slurry may be applied by screen printing, and the amount of the boron nitride powder used is preferably 1.0 mg/cm$^2$ to 2.5 mg/cm$^2$. If the amount of the boron nitride powder used is too small, the prepared substrates can easily stick to one another. If too much boron nitride powder is used, the high-temperature shrinkage of the substrates will be hindered to a certain degree, and as a result, the prepared substrates will have a relatively large size, lower flatness and higher surface roughness.

Debinding of Batched Substrate Green Bodies: the stacked substrate green bodies are put into a high-purity boron nitride crucible, which is loaded into a heat treatment furnace and vacuumized step by step to prevent the displacement of the boron nitride powder between the layers. The substrate green bodies are then treated by heat (debound) at a certain temperature in a nitrogen atmosphere or reducing atmosphere with a micro-positive pressure. In an alternative embodiment, the rate of the step-by-step vacuumization is controlled by the opening degree of a vacuum valve, the duration of vacuumization and the vacuum degree. The step-by-step vacuumization may be performed in at least three stages: firstly, vacuumization is performed for 10 to 15 minutes to make the vacuum degree reach 60 kPa to 80 kPa; secondly, vacuumization is performed for 10 to 15 minutes to make the vacuum degree reach 10 kPa to 30 kPa; and thirdly, vacuumization is performed for 10 to 15 minutes to make the vacuum degree less than 5 Pa. The debinding treatment includes the following step: a reducing nitrogen mixed atmosphere with a hydrogen content not higher than 5% is introduced to generate micro-positive pressure, the atmosphere pressure may be 0.1 MPa to 0.2 MPa, the treatment temperature may be 500° C. to 900° C., and the duration of treatment may be 1 to 3 hours. If the step-by-step vacuumization is not adopted, it is difficult to thoroughly prevent the displacement of the boron nitride powder for isolation between the substrate green bodies due to high vacuumization speed and excessive vacuumizing force, which will cause most of adjacent substrates to stick to each other in the subsequent high-temperature sintering process.

Nitridation of Batched Substrate Green Bodies: if the original powder contains the silicon powder, the substrate green bodies are nitrided at a certain temperature in a mixed hydrogen/nitrogen atmosphere with a hydrogen content not higher than 5%. The atmosphere pressure may be 0.1 MPa to 0.2 MPa, the nitridation temperature may be 1350° C. to 1450° C., and the duration of nitridation may be 3 to 6 hours.

Sintering of Batched Substrate Green Bodies: under a high nitrogen atmosphere pressure, a high-heat capacity graphite kiln furniture is used to further homogenize the internal temperature field of a sintering furnace, and the batched substrates are densified by gas pressure sintering at a certain temperature. The parameters of gas pressure sintering under high nitrogen pressure include: atmosphere pressure: 0.5 MPa to 10 MPa; sintering temperature: 1800° C. to 2000° C.; and duration of heat preservation: 4 to 12 hours. Preferably, the high-heat capacity graphite kiln furniture is of a multi-layer grid structure, and boron nitride crucibles loaded with the substrate green bodies are evenly arranged on the graphite kiln furniture.

In the present disclosure, the batch sintering of the high-property silicon nitride ceramic substrate is accomplished. The thermal conductivity of the resulting silicon nitride ceramic substrate material measured by a laser thermal conductivity testing instrument is greater than 80 Wm$^{-1}$·K$^{-1}$. The breakdown field strength of the resulting silicon nitride ceramic substrate material measured by a breakdown voltage strength tester is more than 25 KV/mm. The thickness deviation of the resulting silicon nitride ceramic substrate material measured by a micrometer may be ±0.04 mm. The flatness of the resulting silicon nitride ceramic substrate material measured by a profilometer may be 0 mm/mm to 0.002 mm/mm. The surface roughness of the resulting silicon nitride ceramic substrate material measured by the profilometer may be 0.3 μm to 0.8 μm. In the present disclosure, the resulting silicon nitride ceramic substrate material can be regarded as an acceptable product in the case that the aforementioned parameters are met, and the pass rate of the resulting silicon nitride ceramic substrate is not less than 60%, preferably not less than 70%, more preferably not less than 80%, and most preferably not less than 90%.

Examples will be taken to further illustrate the present disclosure in detail below. It should also be understood that the following examples are only used to further illustrate the present disclosure rather than to limit the protection scope of the present disclosure. All non-essential improvements and adjustments which are made by those skilled in the art according to the above contents of the present disclosure shall fall within the protection scope of the present disclosure. The specific technological parameters of the following examples are merely one example in an appropriate range, that is, those skilled in the art can make choices within the appropriate range through the description herein, but the choices are not limited to the specific values of the following examples.

Examples of Preparation of Silicon Nitride Ceramic Substrate Green Body

Firstly, original powder (silicon nitride powder and/or silicon powder), sintering aids ($Y_2O_3$ and MgO), dispersant, defoamer, binder, plasticizer and anhydrous ethanol were ball-milled and mixed (30 rpm to 100 rpm, 6 to 24 hours) in a protective atmosphere (e.g., $N_2$ atmosphere with a pressure of 0.1 MPa) in a closed container, and the mixture was then degassed in vacuum (−0.1 kPa to −10 kPa, 6 to 24 hours), so that an agglomerate-free and bubble-free mixed slurry was prepared. Then, tape-casting was performed in a $N_2$ atmosphere (0.1 MPa to 0.2 MPa), and drying was performed in a flowing hot $N_2$ atmosphere (temperature range: 40° C. to 85° C.; atmosphere pressure: 0.1 MPa to 0.2 MPa; and flow rate: 10 to 1000 liters/min), so that the preparation of a tape-cast film green body with uniform thickness and no bubbles on the surface was completed. Finally, the cut tape-cast film green body (substrate green body) was subjected to cold isostatic press shaping pretreatment (40 MPa to 200 MPa, 2 to 10 minutes) to obtain a silicon nitride ceramic substrate green body.

Example 1

Firstly, a silicon nitride ceramic substrate green body with a thickness of 0.4 mm was prepared by wet mixing, vacuum degassing, tape casting and other processes; a thin layer of boron nitride slurry was applied on the surface of the substrate green body by the screen printing process, the substrate green body was cut into samples with the specifications of 88 mm*73 mm after the slurry was dried, and twenty samples with the same specifications mentioned above were stacked and put into high-purity boron nitride crucibles with an internal space of 100 mm*100 mm*30 mm.

Secondly, the boron nitride crucibles loaded with the silicon nitride ceramic substrate green bodies inside were evenly and regularly placed on a sintering fixture (or referred to as a graphite kiln furniture) composed of a high-purity graphite multilayer grid structure, which was put into a gas pressure sintering furnace.

Thirdly, heat treatment was performed according to the following process sequence: (1) vacuumization was performed for 15 minutes to make the vacuum degree reach 65 kPa to 75 kPa, vacuumization was continued for 15 minutes to make the vacuum degree reach 15 kPa to 25 kPa, and vacuumization was then performed for 15 minutes to make the vacuum degree reach 1 Pa to 2 Pa; (2) a vacuum system was closed, and $N_2$ gas (containing 5% of $H_2$) was slowly introduced to 0.15 MPa; (3) under the protection of 0.15 MPa $N_2$ atmosphere (containing 5% of $H_2$), debinding pretreatment was performed for 2 hours after temperature was raised to 700° C. at a rate of 5° C./min; (4) under the protection of 0.15 MPa $N_2$ atmosphere, low-temperature heat treatment was performed for 1 hour after temperature was raised to 1700° C. at a rate of 5° C./min; (5) the internal atmosphere pressure of the sintering furnace was increased to 8 MPa by $N_2$ atmosphere, and under the protection of 8 MPa $N_2$ atmosphere, high-temperature sintering was performed for 5 hours after temperature was raised to 1920° C. at a rate of 4° C./min; and (6) the resulting the silicon nitride ceramic substrates were cooled to room temperature along with the furnace.

Figure 1:
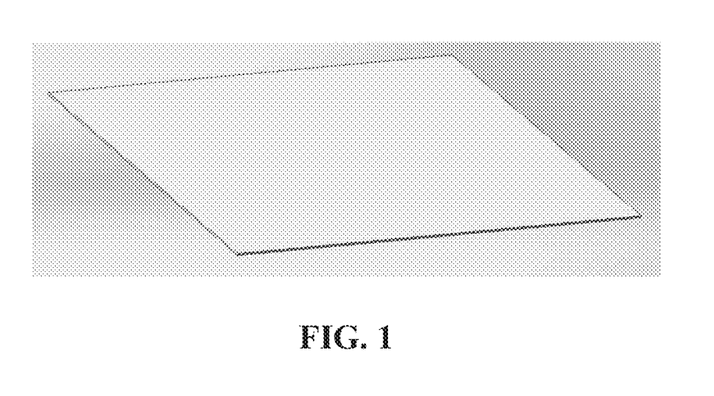
FIG. 1 is a schematic diagram of a silicon nitride substrate green body.
Figure 2:
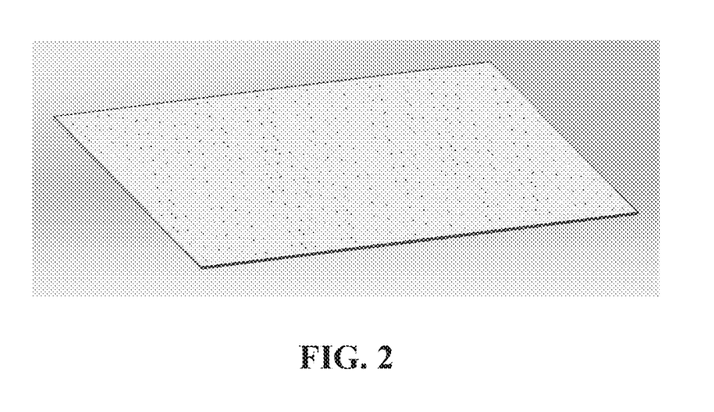
FIG. 2 is a schematic diagram of a silicon nitride substrate green body on which boron nitride powder is applied.
Figure 3:
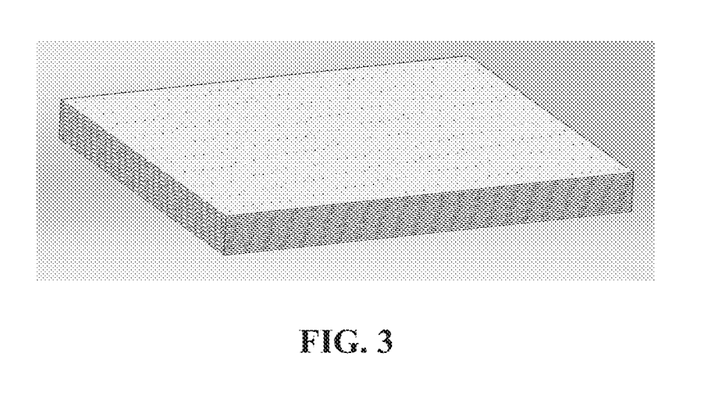
FIG. 3 is a schematic diagram of the stacking of twenty silicon nitride substrate green bodies with boron nitride powder applied on the surfaces.
Figure 4:
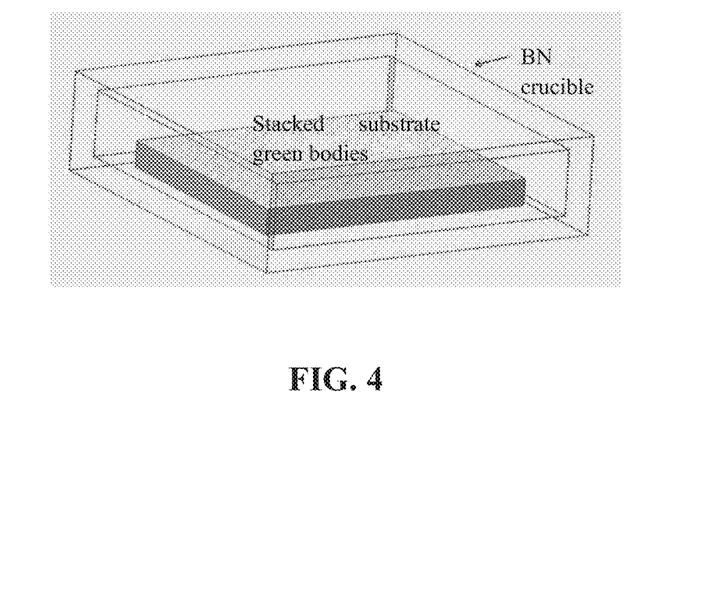
FIG. 4 is a schematic diagram of twenty stacked silicon nitride substrate green bodies placed in a boron nitride crucible.
Figure 5:
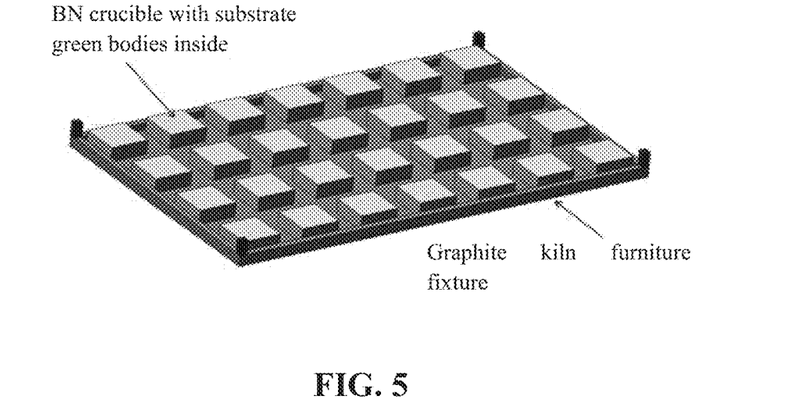
FIG. 5 is a schematic diagram of boron nitride crucibles with to-be-sintered silicon nitride substrate green bodies loaded inside being placed on a graphite kiln furniture fixture in order (single layer).
Figure 6:
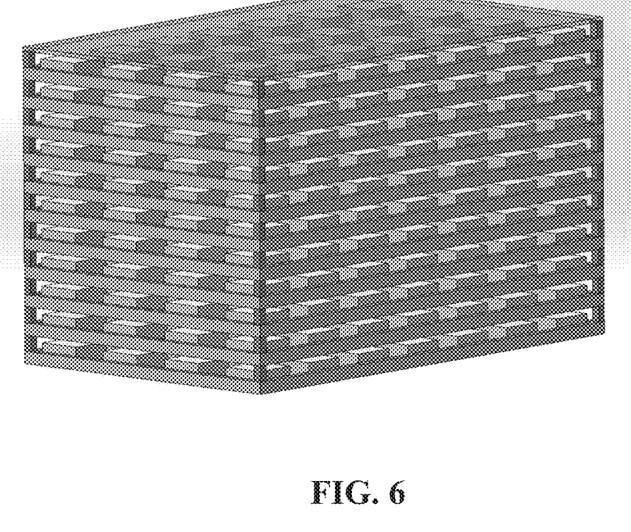
FIG. 6 is a schematic diagram of boron nitride crucibles with to-be-sintered silicon nitride substrate green bodies loaded inside being placed on a graphite kiln furniture fixture in order (multiple stacked layers).
Figure 7:
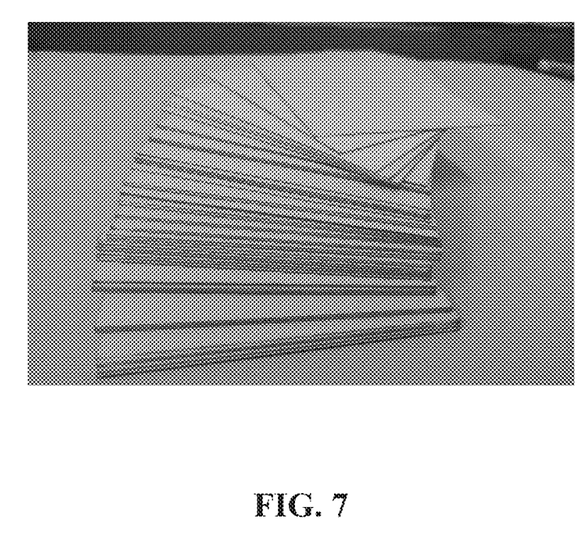
FIG. 7 is a picture of real silicon nitride ceramic substrates prepared in Example 1.

As shown in FIG. 1, the silicon nitride ceramic substrate prepared in Example 1 has a thermal conductivity of 93 W/(m·K) and a breakdown field strength of 42 KV/mm; the substrate size is 70 mm*58 mm, the thickness is 0.32±0.02 mm, the flatness is 0.03 mm, and the surface roughness is 0.4 µm; the substrates do not stick to one another, and therefore can be easily separated; there is no obvious difference between the different substrates in the same crucible, and there is no obvious difference between the different substrates in the different crucibles in the same furnace.

Examples 2 to 5

Figure 8:
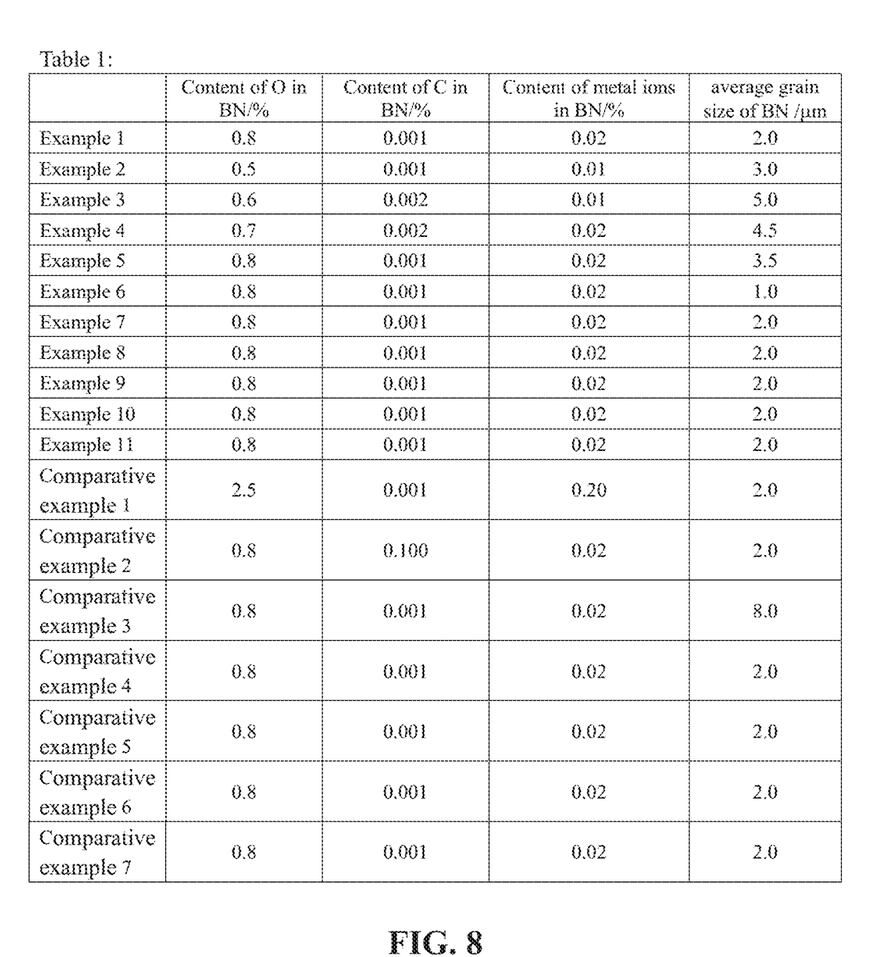
FIG. 8 is Table 1 which shows the property parameters of BN powders used in examples and comparative examples in the present disclosure.

Specific parameters, such as green body size, characteristics (impurity content, average grain size and applied amount) of boron nitride powder for substrate green body isolation, number of stacked substrate green bodies, vacuumization process, graphite grid structure form, debinding process and sintering process, are shown in Table 1 in FIG. 8 and Table 2 in FIG. 9. For the process, refer to Example 1, and the characteristics of the prepared substrate material are shown in Table 3.

Example 6

Figure 10:
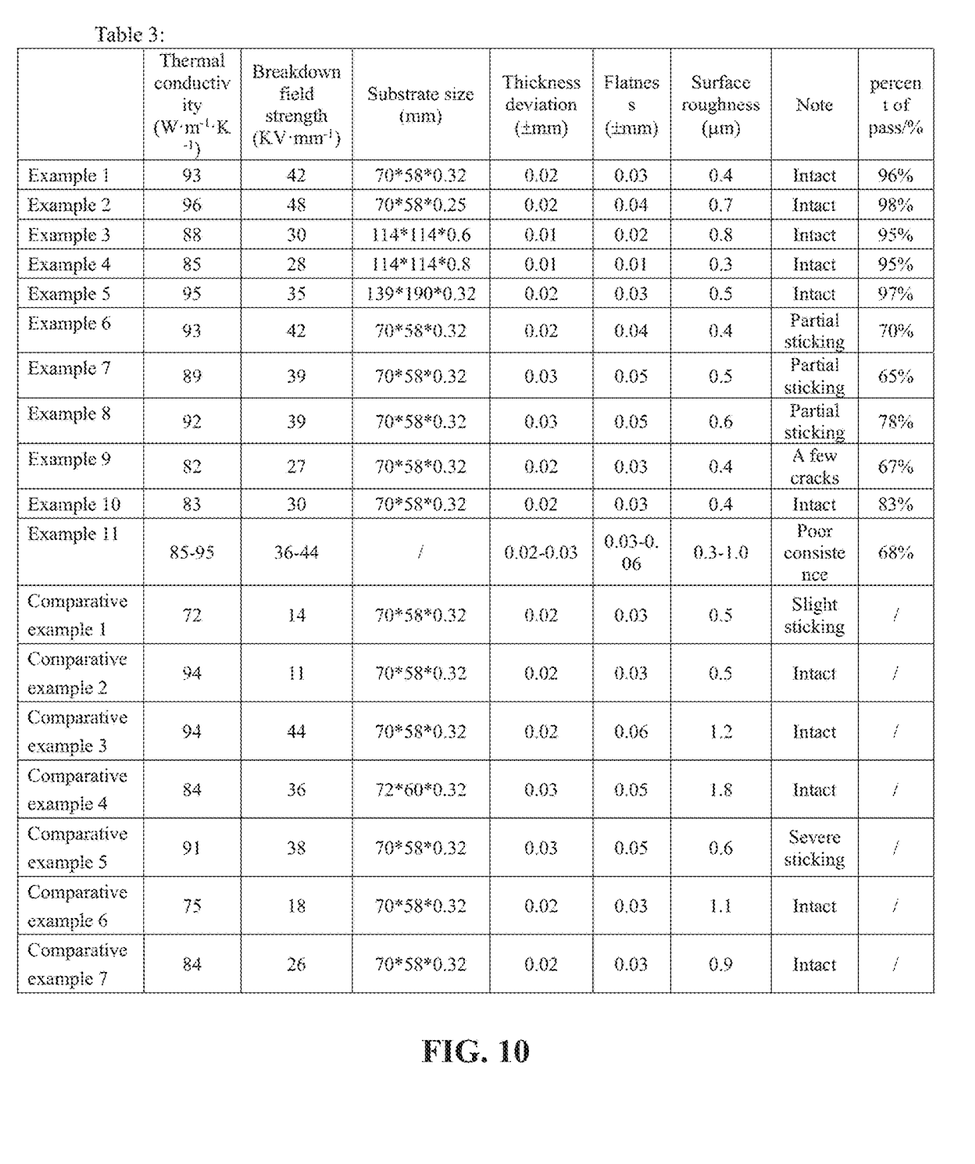
FIG. 10 is Table 3 which shows the property parameters of silicon nitride ceramic substrates in the present disclosure.

The specific process parameters are in accordance with Table 1 in FIG. 8 and Table 2 in FIG. 9, and the process is in accordance with Example 1. The characteristics of the prepared substrate material are shown in Table 3 in FIG. 10. Due to the small average grain size of boron nitride powder used, the prepared substrates partially stuck to one another. Compared with Example 1, the product percent of pass decreased.

Example 7

The specific process parameters are in accordance with Table 1 in FIG. 8 and Table 2 in FIG. 9, and the process is in accordance with Example 1. The characteristics of the prepared substrate material are shown in Table 3 in FIG. 10. Due to the small amount of boron nitride powder used, the prepared substrates partially stuck to one another. Compared with Example 1, the product percent of pass decreased.

Example 8

The specific process parameters are in accordance with Table 1 in FIG. 8 and Table 2 in FIG. 9, and the process is in accordance with Example 1. The characteristics of the prepared substrate material are shown in Table 3. A two-step vacuumization control measure was adopted (vacuumization was performed for 20 minutes first to make the vacuum degree reach 20 kPa to 30 kPa, and vacuumization was then performed for 15 minutes to make the vacuum degree reach 1 Pa to 2 Pa). Although the measure of controlling the rate of vacuumization step by step had been adopted, the process of vacuumization was only divided into two steps, and the rate of vacuumization was still high, and the vacuumizing force was still too great. As a result, the boron nitride powder between the substrate green bodies was partially displaced or even drawn out, failing to fully ensure the thorough isolation between the substrates, causing the prepared substrates to stick to one another. Compared with Example 1, the product percent of pass decreased.

Example 9

The specific process parameters are in accordance with Table 1 in FIG. 8 and Table 2 in FIG. 9, and the process is in accordance with Example 1. The characteristics of the prepared substrate material are shown in Table 3 in FIG. 10. Because the debinding process was not adopted in a reducing atmosphere with a micro-positive pressure (but in a low-pressure nitrogen atmosphere, i.e. 0.05 MPa $N_2$ atmosphere), the thermal conductivity and breakdown field strength of the material were reduced, and some samples had microcracks. Compared with Example 1, the product percent of pass decreased.

Example 10

The specific process parameters are in accordance with Table 1 in FIG. 8 and Table 2 in FIG. 9, and the process is in accordance with Example 1. The characteristics of the prepared substrate material are shown in Table 3 in FIG. 10. Because the debinding process was not adopted in a reducing atmosphere with a micro-positive pressure (but in a nitrogen atmosphere with a micro-positive pressure, i.e. 0.15 MPa $N_2$ atmosphere), the thermal conductivity and breakdown field strength of the material were reduced.

Example 11

The specific process parameters are in accordance with Table 1 in FIG. 8 and Table 2 in FIG. 9, and the process is in accordance with Example 1. The characteristics of the prepared substrate material are shown in Table 3 in FIG. 10. Because the multi-layer grid kiln furniture, which played the dual roles of setter plate and temperature zone control, was not made of a high-heat capacity graphite material, there existed a certain temperature difference between different positions in the furnace chamber of the sintering furnace, which ultimately led to the low consistency of the material properties and surface quality (substrate size, flatness, surface roughness, etc.) of the prepared substrates, and as a result, the product percent of pass was lower than that of Example 1.

Comparative Example 1

The specific process parameters are in accordance with Table 1 in FIG. 8 and Table 2 in FIG. 9, and the process is in accordance with Example 1. The characteristics of the prepared substrate material are shown in Table 3 in FIG. 10. Because the contents of O and metal impurity ions in the boron nitride powder used were too high, the thermal conductivity and breakdown field strength of the prepared substrates were obviously decreased, and the substrates slightly stuck to one another.

Comparative Example 2

The specific process parameters are in accordance with Table 1 in FIG. 8 and Table 2 in FIG. 9, and the process is in accordance with Example 1. The characteristics of the prepared substrate material are shown in Table 3 in FIG. 10. Because the content of C in the boron nitride powder used was too high, the breakdown field strength of the prepared substrates was obviously decreased.

Comparative Example 3

The specific process parameters are in accordance with Table 1 in FIG. 8 and Table 2 in FIG. 9, and the process is in accordance with Example 1. The characteristics of the prepared substrate material are shown in Table 3 in FIG. 10. Because the average grain size of the boron nitride powder was too large, the flatness of the prepared substrates was decreased, and the surface roughness was obviously increased.

Comparative Example 4

The specific process parameters are in accordance with Table 1 in FIG. 8 and Table 2 in FIG. 9, and the process is in accordance with Example 1. The characteristics of the prepared substrate material are shown in Table 3 in FIG. 10. Due to the excessive amount of the boron nitride powder used, the high-temperature shrinkage of the substrates was hindered to a certain degree. As a result, the size of the prepared substrate was too large, the flatness was decreased, and the surface roughness was obviously increased.

Comparative Example 5

The specific process parameters are in accordance with Table 1 in FIG. 8 and Table 2 in FIG. 9, and the process is in accordance with Example 1. The characteristics of the prepared substrate material are shown in Table 3 in FIG. 10. The step-by-step and slow vacuumization measure was not taken (because the opening degree of the vacuum valve was not controlled and vacuumization was directly performed for 30 minutes, the vacuum degree reached 1 Pa to 2 Pa). Since the opening degree of the vacuum valve was not controlled (fully opened) and step-by-step vacuumization was not adopted, the vacuumizing force was too great, and as a result, the boron nitride powder between the substrate green bodies was obviously displaced or even drawn out, failing to ensure the thorough isolation between the substrates, causing the prepared substrates to severely stick to one another.

Comparative Example 6

The specific process parameters are in accordance with Table 1 in FIG. 8 and Table 2 in FIG. 9, and the process is in accordance with Example 1. The characteristics of the prepared substrate material are shown in Table 3 in FIG. 10. Because the sintering process was not adopted in a nitrogen atmosphere with a high pressure of 0.5 MPa to 10 MPa (but in a nitrogen atmosphere with atmospheric pressure, i.e. 0.1 MPa $N_2$ atmosphere), the thermal conductivity and breakdown field strength of the prepared substrate material were obviously decreased, the surface roughness of the substrate was obviously increased, and as a result, the product percent of pass decreased.

Comparative Example 7

The specific process parameters are in accordance with Table 1 in FIG. 8 and Table 2 in FIG. 9, and the process is in accordance with Example 1. The characteristics of the prepared substrate material are shown in Table 3 in FIG. 10. Because the sintering process was not adopted in a nitrogen atmosphere with a high pressure of 0.5 MPa to 10 MPa (but in 0.3 MPa N$_2$ atmosphere), the thermal conductivity and breakdown field strength of the prepared substrate material were decreased to a certain degree, the surface roughness of the substrate was increased to a certain degree, and as a result, the product percent of pass decreased to a certain degree.

What is claimed is:

1. A batch sintering method for making a high-property silicon nitride ceramic substrate, comprising the following steps:
   (1) stacking silicon nitride ceramic substrate green bodies, putting the silicon nitride ceramic substrate green bodies into a boron nitride crucible, and applying a layer of boron nitride powder between adjacent silicon nitride ceramic substrate green bodies;
   (2) performing step-by-step vacuumization, and then debinding in a nitrogen atmosphere or a reducing atmosphere at 500° C. to 900° C.; wherein the step-by-step vacuumization is performed in at least two steps or at least three steps; if vacuumization is performed in the at least two steps, parameters of the step-by-step vacuumization include: a first step of 20 to 30 minutes of vacuumization for making a vacuum degree reach 20 kPa to 30 kPa, and a second of 10 to 20 minutes of vacuumization for making a vacuum degree less than 10 Pa; or if vacuumization is performed in the at least three steps, parameters of the step-by-step vacuumization include: a first step of 10 to 15 minutes of vacuumization for making a vacuum degree reach 60 kPa to 80 kPa, a second step of 10 to 15 minutes of vacuumization for making a vacuum degree reach 10 kPa to 30 kPa, and a third step of 10 to 15 minutes of vacuumization for making a vacuum degree less than 10 Pa; and then
   (3) performing gas pressure sintering in a nitrogen atmosphere at 1800° C. to 2000° C., thereby completing a batch preparation of the high-property silicon nitride ceramic substrate.

2. The batch sintering method according to claim 1, wherein a number of the stacked silicon nitride ceramic substrate green bodies is 5 to 50.

3. The batch sintering method according to claim 1, wherein in the boron nitride powder, a content of O is not more than 1%, a content of C is not more than 0.01%, and a content of metal impurity ions is not more than 0.02%; and an average grain size of the boron nitride powder is 1 μm to 5 μm.

4. The batch sintering method according to claim 3, wherein the average grain size of the boron nitride powder is 2 μm to 5 μm.

5. The batch sintering method according to claim 1, wherein an amount of the boron nitride powder used is 1.0 mg/cm$^2$ to 2.5 mg/cm$^2$.

6. The batch sintering method according to claim 5, wherein the amount of the boron nitride powder used is 1.5 mg/cm$^2$ to 2.5 mg/cm$^2$.

7. The batch sintering method according to claim 1, wherein in Step (2), a pressure of the nitrogen atmosphere or the reducing atmosphere is 0.05 MPa to 0.2 MPa; wherein the reducing atmosphere is a nitrogen/hydrogen mixed atmosphere with a hydrogen content not higher than 5%; and a duration of debinding is 1 to 3 hours.

8. The batch sintering method according to claim 7, wherein in Step (2), the pressure of the nitrogen atmosphere or the reducing atmosphere is 0.1 MPa to 0.2 MPa.

9. The batch sintering method according to claim 1, wherein a pressure of the nitrogen atmosphere in Step (3) is 0.5 MPa to 10 MPa; and a duration of the gas pressure sintering is 4 to 12 hours.

10. The batch sintering method according to claim 1, further comprising providing a plurality of boron nitride crucibles including the boron nitride crucible, stacking silicon nitride ceramic substrate green bodies, putting stacked silicon nitride ceramic substrate green bodies in each of the plurality of boron nitride crucibles, applying a layer of boron nitride powder between adjacent silicon nitride ceramic substrate green bodies in each of the plurality of boron nitride crucibles, evenly arranging the plurality of boron nitride crucibles in a graphite kiln furniture, and performing gas pressure sintering in the graphite kiln furniture.

11. The batch sintering method according to claim 10, wherein the graphite kiln furniture has a multi-layer grid structure.

12. The batch sintering method according to claim 1, further comprising preparing each silicon nitride ceramic substrate green body by slurry tape-casting or powder pressing;
   wherein the slurry tape-casting comprises the following steps:
   (1) mixing at least one of silicon nitride powder and silicon powder as original powder, sintering aids, dispersant, defoamer, binder and plasticizer in a protective atmosphere to form a mixture, degassing the mixture in vacuum to obtain a mixed slurry;
   (2) tape-casting and drying the mixed slurry in a nitrogen atmosphere to obtain a first green body; and
   (3) performing shaping pretreatment on the first green body to obtain a respective silicon nitride ceramic substrate green body.

13. The batch sintering method according to claim 12, wherein if the original powder contains the silicon powder, a weight of the silicon powder is not less than 75% of that of the original powder, wherein a weight of the original powder is a sum of a weight of the silicon nitride powder and a weight of silicon nitride produced after complete nitridation of the silicon powder.

14. The batch sintering method according to claim 13, further comprising, before the step of performing gas pressure sintering, nitriding a debound silicon nitride ceramic substrate green body, wherein parameters of the nitriding include: nitrogen atmosphere: nitrogen/hydrogen mixed atmosphere with a hydrogen content not higher than 5%; pressure: 0.1 MPa to 0.2 MPa; nitridation temperature: 1350° C. to 1450° C.; and duration of nitridation: 3 to 6 hours.

\* \* \* \* \*